United States Patent [19]
Carroll

[11] 3,837,304
[45] Sept. 24, 1974

[54] DEEP IMPLANTATION OF A VOLATILE FUNGICIDE

[75] Inventor: William J. Carroll, Costa Mesa, Calif.

[73] Assignee: Great Lakes Chemical Corporation, West Lafayette, Ind.

[22] Filed: Oct. 20, 1971

[21] Appl. No.: 190,825

Related U.S. Application Data

[63] Continuation-in-part of Ser. No. 33,867, May 1, 1970, abandoned.

[52] U.S. Cl. .................................................. 111/6
[51] Int. Cl. ........................................... A01c 23/02
[58] Field of Search .................... 424/350; 111/1, 6; 175/394

[56] References Cited
UNITED STATES PATENTS

| | | | |
|---|---|---|---|
| 2,448,265 | 8/1948 | Kagy et al. .......................... | 111/6 X |
| 3,394,667 | 7/1968 | White .................................... | 111/6 |
| 3,640,234 | 2/1972 | Carroll et al. ........................ | 111/6 |

FOREIGN PATENTS OR APPLICATIONS

| | | | |
|---|---|---|---|
| 1,112,954 | 5/1968 | Great Britain ....................... | 111/6 |

OTHER PUBLICATIONS

Factors Affecting –, Stolzy et al., Phytopathology, Vol. 59, Aug. 1969, page 1036 relied on.

Primary Examiner—Robert E. Bagwill
Attorney, Agent, or Firm—Laurence, Laurence & Neilan

[57] ABSTRACT

Method of controlling soil fungi by the deep implantation of a volatile fungicide to a closed chamber at least 3 feet in depth.

5 Claims, No Drawings

DEEP IMPLANTATION OF A VOLATILE FUNGICIDE

CROSS REFERENCE TO RELATED APPLICATION

This application is a continuation-in-part of my co-pending application Ser. No. 33,867, filed May 1, 1970 now abandoned.

This invention pertains to a method of controlling pathogenic soil fungi, more particularly to a method of controlling soil fungi of the genera *Armillaria* and the family Pythiaceae which cause plant diseases of the root rot type by the deep implantation of a volatile fungicide to a closed chamber formed at a depth of at least three feet.

BACKGROUND OF THE INVENTION

Various diseases of the plant kingdom are caused by fungi which dwell in the soil. The manifestations of these plant diseases may appear in the plant as it is visible above ground, or may only occur in the root structure causing the destruction of the plants from within. Plant diseases may be combated either by the topical application of treating agent to the plant or systematically through the root structure. Nematodes and like infestations are usually controlled by the direct application and admixture of a controlling agent to the infested soil.

The instant invention pertains to the treatment of fungus diseases but because the agents used are the same as have been used in treatment of insect infestations such as grubs and nematodes, it is of interest to consider the teachings in that art area.

U.S. Pat. No. 3,105,005, issued Sept. 24, 1963, to Cannon et al., teaches the nematodes are found in soil up to a depth of 5 feet or more below the soil surface. Yet in spite of this knowledge Cannon suggests treatment by depositing an agent in "the infested area at depths of 12 to 24 inches below the soil level by injection or drilling techniques." The agent used by Cannon was not a very volatile agent because he feared the rapid loss of more volatile agents. Cannon teaches that more volatile agents cannot be maintained for any extended time period in the soil. U.S. Pat. No. 3,133,857, issued May 19, 1964 to Swezey teaches the depositing of a more volatile fumigant such as dibromomethane and dichloropropene "at a depth of from about 4 inches to 24 inches below the soil surface." In discussing the retention of these agents in the soil Swezey points out that moist or wet soil will retain the fumigant for a longer period. U.S. Pat. No. 2,473,984, issued June 21, 1949, teaches the use of such agents as ethylene chloride, methyl bromide, carbon disulfide and chloropicrin, as fumigant agents, particularly useful in destroying nematodes and like insects, which are injected into the soil to a depth of 3 to 8 inches below the soil surface and about a foot apart. Stone in U.S. Pat. No. 2,912,793, issued Nov. 17, 1959 discloses in a discussion of the application of sulfur dioxide as a nematocide "the preferred depth of application is about 6–8 inches. At much shallower depths, the sulfur dioxide may volatilize out of the soil and be lost too rapidly for effectiveness. Greater depths may be difficult to attain with conventional equipment, and the action of the sulfur dioxide may fail to extend to nematodes in the surface layers of soil when the nematocidal agent is buried too deeply." Kagy et al., in U.S. Pat. No. 2,448,265, issued Aug. 31, 1948 describes the usual techniques employed in the art for extending the time a fumigant is held in the soil as blanketing the soil with paper or tarpaulins or maintaining high moisture. Kagy et al., also discloses that on tests conducted with ethylene bromide it is expected that the fumigant will permeate the soil for a distance of 6 to 9 inches when injected into the soil at from 2–7 inches deep. Thiegs in U.S. Pat. No. 2,916,855, issued Dec. 15, 1959 discloses the use of foam as a substitute for tarpaulins and plastic covers.

The root rot diseases are commonly known as oak fungus, oak root fungus, mushroom root rot, shoestring rot and *Armillaria* root rot. This particular disease is caused by fungi of the genera *Armillaria Mellea*. The method of this invention is also effective against other root rot diseases on woody plants such as those caused by *Rosellinia Necatrix*, *Xylaria Malis*, *Corticium Galactinum*.

The control of root rot, mal di gomma, gummosis and brown rot gummosis, which are names given disease that attaches citrus trees generally caused by species of the genera *Phytophthora*, can also be effected by the method of this invention. The species *Phylophthora cactorum* which causes the "water rot" of nut trees, such as filberts and persian walnuts, can also be controlled by the method of this invention.

The effects of these root rot diseases are wide spread. Various species of woody stem plants on all continents are susceptible to the root rot of *Rosellinia* and *Armillaria Mellea*. Susceptible plants include fruit trees, including small seed fruit such as apples, pears; stone fruits such as cherries, peaches, plums, apricot, etc.; nut trees, such as filberts and walnuts; vines, such as grapes and coffee plants.

The methods currently in use to combat the root rot diseases are of limited effectiveness and all are costly in both work expended and money expended beside being time consuming.

As discussed in *Plant Diseases*," *Year Book of Agriculture*, 1953, U.S. Government Printing Office 83rd Congress House Docket No. 122, page 703, *Armillaria* can be treated by surface application soil fumigation techniques. It is also recognized in the art that for the treatment to be effective against *Armillaria* it is necessary for the fungicidal agent to penetrate from the surface to a depth of 6 or 7 feet. In 1953, and today, the Department of Agriculture only recommends treatment with carbon disulfide. The treatment comprises removing all dead trees, roots, etc., from the area to be treated and then injecting carbon disulfide 6 to 8 inches below the soil surface at points 18 inches apart in staggered rows and preferably sealing the surface with foam or tarpolins with the proviso that injections not be made within 6 to 8 feet of a living tree because of possible injury to root structure. These methods require a lot of labor, and yet the depth of penetration is not sufficient to obtain adequate effective control of *Armillaria*. Other of the root rot diseases, particularly those causing crown rot, are treated by exposing the upper root system nd allowing the roots to dry. All of these measures are only partially effective or are "stop gap" at best. Some attempts have been made to use disease resistant stock, but this of course necessitates tearing up existing orchards and the planting of new orchards, usually producing a different kind of fruit. In many cases there is no choice but to let the field lie fallow.

It is an object of this invention to provide a method for the control of soil fungi which overcomes the above enumerated disadvantages.

It is a further object of this invention to provide a method for the control of soil fungi by the deep implantation of a volatile fungicide.

Another object of this invention is to provide a method for the control of soil fungi by the deep implantation of a volatile fungicide to a depth of at least 3 feet.

A still further object of this invention is to provide a method for the control of soil fungi by the deep implantation of a volatile fungicide to a closed chamber formed at a depth of at least 3 feet.

Other objects and advantages of this invention will be apparent from the following discussion.

SUMMARY OF INVENTION

This invention contemplates a method of controlling pathogenic soil fungi, in particular soil fungi which cause various rot diseases of woody stem plants. Most particularly the method is effective in controlling *Armillaria, Phytophthora and Pythium* and like fungi. The method entails implanting a charge of a volatile fungicidal agent at a depth of at least 3 feet below the soil surface wherein the charge is implanted in a manner that there is substantially no direct communication between the charge and the surface except by means of diffusion through the soil.

DESCRIPTION OF THE PREFERRED EMBODIMENT

*Armillaria, Phytophthora* and *Pythium* and like fungi dwell deep in the soil. These fungi kill plants by either destroying the root structure or spreading through the root structure to the woody stem or a combination of methods. Ground application of chemicals or direct application of chemicals to exposed disease areas have only limited effect on the deep rooted fungi. The usual methods of soil injection of chemical agents to the top layer (about 1 foot) of soil have not been able to penetrate and remain in the soil to sufficiently maintain effective concentrations of agents at these depths for the required extended time periods.

It was the surprising discovery of this invention that, if a concentrated charge or pocket of a volatile fumigant is implanted at a depth of at least 3 feet below the soil surface and more preferably at a depth of 4 to 6 feet below the surface of the soil, a surprisingly broad penetration of the fumigant results from this point source and an effective concentration of agent is maintained for exceptional periods of time at depths below the surface level which are not possible by surface application of the agents. Also contrary to the teachings of the prior art effective treatment of the soil and removal of the disease occurs from the surface to surprising depths below the surface. The most convenient working depth for implantation of the agent is 5 feet below the soil surface.

Various physical factors will of course effect the spread of the agent. These factors include:
a. The vapor pressure of the agent
b. Chemical reactivity of soil components
c. Soil type and porosity
d. Moisture content
e. Temperature.

Between like agents, better penetration and coverage is achieved at the deep implantation than at surface application (includes depths up to 8 inches) with cover.

The water table and level of the hard pan can effect the distribution pattern of the agent. In the average orchard the soil is porous to about 10-15 feet below the surface of the soil.

The method of this invention is applicable to soil wherever *Armillaria Mellea* and related soil fungi are a problem. This includes coffee plantations in South America and Africa and grape arbours and orchards on any continent.

Suitable fungicides for use in this invention are those volatile fungicides having a high vapor pressure and a relatively dense vapor phase. This includes, but is not limited to, methyl bromide (vapor density 3.976), carbon disulfide (vapor density 2.67), dibromomethane, dichloromethane, ethylene dibromide, ethylene chloride, dichloropropanes, chloropicrin and the like, and mixtures of these components. These agents may be implanted as the liquid or as a gel. A gel form of the fungicidal agent is advantageously utilized where it is desired to retard the rate of evaporation and permeation of the fungicide and extend the contact time of the agent in the soil. The preferred fungicide employed in the method of this invention is methyl bromide.

Although the discussion of the method of this invention is limited for convenience to the use of methyl bromide, it is to be understood that any volatile fungicide having high vapor pressures and a relatively dense vapor phase, as discussed above, may be utilized.

The following discussion, utilizing methyl bromide, illustrates the method of this invention.

The methyl bromide is brought into contact with the particular pathogenic fungi preferably by vapor operation from a single source implanted at least 3 feet into infected soil.

*Armillaria Mellea* is contacted with at least 500 ppm (parts per million) preferably 1,000 ppm and in the most preferred embodiment a concentration of about 3,000 ppm or higher of methyl bromide.

It has been found that when the concentration of methyl bromide in the soil atmosphere is on the order of 500 ppm, the concentration has to be maintained for about 10.5 days to insure 95 percent kill of the pathogen. The higher the concentration of methyl bromide, the shorter the necessary contact time. At a concentration of 1,000 ppm, contact need only be maintained for 7 days and at a concentration of 3,000 ppm, contact need only be maintained for 1.6 days. These concentrations are achieved by implanting 1 to 10 pounds of the agent in each implantation site. The implantation of one charge of 1-10 pounds in a site is equivalent to applying 1-10 pounds respectively of agent per 100 square feet of ground surface.

In the case of *Armillaria Mellea*, it is surprising to find that the effectiveness of the fumigant is improved by contacting the *Armillaria* fungi with methyl bromide in the presence of non-sterile orchard soil, in particular soil which contains *Trichoderma*. This improvement may result from the action of *Trichoderma* on the Armillaria which have been weakened, or placed under stress, as a result of the action of the fungicidal agent on it or the surrounding soil environment. The presence of *Trichoderma* also assists in preventing reinfestation of the area by *Armillaria*.

In a preferred practice of this invention, a volatile fungicidal agent, such as methyl bromide, is charged to a closed chamber or pocket at the end of a passageway, at the depth of at least three feet and preferably about five feet. After implantation of the volatile fungicide, the passageway is sealed with soil. The chamber or pocket, after formation, is essentially unopened to the soil surface. For purposes of this application, the terms chamber and pocket will be used interchangeably and refers to a chamber or pocket which is substantially closed to communication with the surface.

Any of the known means for charging the fungicidal agent to the chamber or pocket may be utilized. A preferred method is by injecting the charge into the pocket.

The means for the formation of the chamber and the means for charging the fungicide to the chamber may be separate or combined as a unit.

An apparatus combining the two units is described and claimed in commonly assigned U.S. Pat. No. 3,640,234 in the names of William J. Carroll and Frank S. Mizusawa.

In the described apparatus, an auger, which is utilized to form the passageway and pocket, is also the charging means. There is a conduit axillarily disposed with the auger and orifices located at the tip of the auger. After the pocket is formed, the fungicide is charged to the pocket through the conduit. The auger is then removed sealing the passageway with soil as it is being removed. The pocket after formation is essentially sealed off from the soil surface so that there is substantially no communication with the surface.

It is apparent that through the use of the above apparatus, the volatile fungicide is not in communication with the soil surface except by diffusion through the soil.

Other embodiments are available for accomplishing the method of this invention, but they are not as convenient as utilizing the described apparatus. The fungicidal agent may be charged to the pocket in a sealed container and the container punctured. Removal of the puncturing device can be accompanied by the filling in or sealing of the passageway formed by the puncturing device. Once again, in this process, the fungicidal agent is substantially never in open communication with the soil's surface except by diffusion through the soil.

Other means for charging and releasing a volatile fungicidal agent in a closed chamber also may be utilized. The essential feature being that from the time the fungicidal agent is released or vaporization of the agent occurs to any noticeable or detectable degree, the chamber or pocket containing the agent is substantially sealed off from the soil's surface. Thus the placing of frozen methyl bromide in a closed chamber is included as an embodiment since the chamber is substantially sealed from the soil's surface at the time the methyl bromide has begun to vaporize to any detectable degree.

The terminology "charging a volatile fungicidal agent to a closed chamber" as utilized in the specification and claims includes both the addition of the fungicidal agent to a chamber which has previously been formed, and the closing of a chamber around an amount of fungicidal agent which had not as yet begun vaporizing to any detectable degree, such as frozen methyl bromide as described in Example I.

The fungicidal agent in a preferred embodiment when charged to the chamber is in an essentially nonvolatile, but volatilizable, form.

In the actual treatment of an infected orchard or vineyard, the implantation sites are drilled to the desired depth in staggered rows or centers spaced between 8 and 14 feet from each other, most preferably on 10-foot centers. Because of the depth of the implantation and greater distance between sites there is less danger of damaging existing root structure than in methods employing surface administration of the agents.

Now, having generally described the method of this invention we shall illustrate specific embodiments of the invention showing the effectiveness of the method and superiority of the method over surface application.

EXAMPLE I

Tests are conducted to determine the extent of the distribution of methyl bromide from a single point source. A plot, 20 feet by 20 feet, is prepared at least 200 feet from any previously used test site. The soil is presently heavily infested with *Armillaria Mellea*. One millimeter I.D. tubing is implanted at various depths and distances from a central point. These tubes function as gas chromatography sensing stations. These stations are established at a horizontal distance from the center of 2, 6, 10 and 14 feet and a depth of 1, 3, 6 and 9 feet deep for each horizontal distance, therefore, there is a total of 16 testing stations. During the test period a gas chromatography is attached to a tube and a sample of soil atmosphere at the set depth is removed and analyzed.

A hole of about 5 feet deep is dug at the center of the site and cans of frozen methyl bromide are deposited in the hole, the cans are punctured and the soil filled and tamped back on top of the cans sealing the charge into the soil. About 4 pounds of methyl bromide is implanted in the site which is equivalent to spreading 1 pound of methyl bromide per 100 square feet of surface. The following tables report the concentration of methyl bromide detected by the gas chromatography apparatus at each station over a period of about a month.

EXAMPLE

Distribution from point source, 4 pounds charge at 5 feet.

A = Horizontal distance from center
B = Vertical distance from soil surface
Concentration expressed in parts per million.

One Day After Implantation

| A\B | 2 | 6 | 10 | 14 |
|---|---|---|---|---|
| 1 | 901 | 28 | + | + |
| 3 | 25,468 | 469 | 84 | + |
| 6 | 73,216 | 3,000 | 73 | + |
| 9 | 474 | 143 | 23 | + |

Three Days

| A/B | 2 | 6 | 10 | 14 |
|---|---|---|---|---|
| 1 | 3,305 | 889 | 54 | 21 |
| 3 | 16,074 | 3,746 | 90 | 10 |
| 6 | 20,411 | 16,584 | 428 | 50 |
| 9 | 1,660 | 3,601 | 92 | 12 |

Five Days

| A/B | 2 | 6 | 10 | 14 |
|---|---|---|---|---|
| 1 | 2,548 | 988 | 855 | 56 |
| 3 | 8,360 | 3,828 | 269 | 86 |
| 6 | 20,949 | 17,024 | 680 | 370 |
| 9 | 2,640 | 5,037 | 330 | 43 |

Twelve Days

| A/B | 2 | 6 | 10 | 14 |
|---|---|---|---|---|
| 1 | 666 | 426 | 140 | 29 |
| 3 | 1,866 | 1,068 | 345 | 78 |
| 6 | 3,268 | 2,172 | 750 | 173 |
| 9 | 3,348 | 2,028 | 792 | 200 |

Twenty Days

| A/B | 2 | 6 | 10 | 14 |
|---|---|---|---|---|
| 1 | 243 | 154 | 68 | 24 |
| 3 | 672 | 464 | 221 | 73 |
| 6 | 1,220 | 837 | 443 | 167 |
| 9 | 1,400 | 1,030 | 523 | 221 |

Twenty-seven Days

| A/B | 2 | 6 | 10 | 14 |
|---|---|---|---|---|
| 1 | 70 | 64 | 31 | 11 |
| 3 | 257 | 201 | 106 | 36 |
| 6 | 542 | 419 | 240 | 61 |
| 9 | 692 | 542 | 313 | 162 |

The lethal dose of at least 1,000 ppm is easily maintained for the minimum period of 7 days resulting in control of the fungus. The above field tests revealed that high concentrations spread within 3 days to at least 10 feet from the implantation site and these concentrations of methyl bromide remain high for a considerable period of time and spread further than one would have been led to believe from prior experience with surface application of similar agents.

EXAMPLE II

A comparison test is conducted by spreading methyl bromide at a concentration of 1 pound per 100 square feet on another test plot removed from previously used sites. Sensors, as described above, are implanted to depths of 1, 3, 6, and 9 feet from the soil surface. Because this is a surface application, sensors cannot be placed to measure horizontal spread. In order to prevent evaporation, the plot is covered with a tarpaulin impervious to methyl bromide such as Mylar or Saran. Such a sealing method is not commercially feasible because of prohibitively high cost of the tarpaulin and high man-power demands.

In dry soil it is possible to maintain a soil atmosphere concentration of methyl bromide of 1,000 ppm or greater for 15 days down to about 6 feet below the surface. The concentration of methyl bromide did not reach 1,000 ppm at a 9 foot depth. In wetter soils the concentration exceeded 1,000 ppm only at a depth of 3 feet for 18 days but did not reach 1,000 ppm concentration at depths of 6 and 9 feet. Tests conducted 30 days after the completion of the test show the oak root fungus under control in the upper soil but the fungus is still present at depths of 6 and 9 feet. The plot subsequently became reinfested.

EXAMPLE III

A field test, for each an infected plot, is conducted by implanting 1 pound charges on 10 foot centers, at a depth of 5 feet, in four staggered rows. A total of 14 implantations are made. A plot 20 by 20 is set out in the center of this site and sensors are driven into the ground as previously described at horizontal distances of 1,3 6, and 9 feet from the nearest implantation site and at depths of 1, 3, 6, and 9 feet for each implantation site. This provides 16 sensor sites. One pound cans of frozen methyl bromide are implanted at each site in the manner described in Example I. During the test period approximately 0.32 inch of rain fell wetting the ground to a depth of about 3-½ inches. The results are reported in the following tables.

A and B are defined in the same manner as in Example I. Concentrations are in ppm.

One Day

| A/B | 1 | 3 | 6 | 9 |
|---|---|---|---|---|
| 1 | 1,500 | 470 | — | — |
| 3 | 19,000 | 6,300 | 640 | — |
| 6 | 40,000 | 16,500 | 2,050 | 2,650 |
| 9 | 4,400 | 860 | — | — |

Three Days

| A/B | 1 | 3 | 6 | 9 |
|---|---|---|---|---|
| 1 | 2,100 | 1,600 | 1,300 | 1,200 |
| 3 | 9,200 | 6,500 | 3,900 | 3,900 |
| 6 | 11,000 | 10,000 | 6,600 | 6,200 |
| 9 | 6,250 | 3,300 | 1,200 | 1,450 |

Five Days

| A/B | 1 | 3 | 6 | 9 |
|---|---|---|---|---|
| 1 | 1,950 | 1,100 | 1,100 | 1,100 |
| 3 | 4,000 | 3,350 | 5,300 | 3,100 |
| 6 | 5,600 | 5,050 | 4,400 | 4,600 |
| 9 | 4,200 | 3,250 | 2,250 | 2,600 |

Seven Days

| A/B | 1 | 3 | 6 | 9 |
|---|---|---|---|---|
| 1 | 1,050 | 740 | 860 | 780 |
| 3 | 2,500 | 2,250 | 2,250 | 2,250 |
| 6 | 3,900 | 3,700 | 3,600 | 3,700 |
| 9 | 3,300 | 3,000 | 2,500 | 2,800 |

Ten Days

| A/B | 1 | 3 | 6 | 9 |
|---|---|---|---|---|
| 1 | 450 | 470 | 520 | 510 |
| 3 | 1,600 | 1,400 | 1,500 | 1,550 |
| 6 | 2,500 | 2,500 | 2,450 | 2,600 |
| 9 | 2,350 | 2,250 | 2,200 | 2,200 |

Fourteen Days

| A/B | 1 | 3 | 6 | 9 |
|---|---|---|---|---|
| 1 | 290 | 310 | 310 | 325 |
| 3 | 980 | 840 | 840 | 820 |
| 6 | 1,550 | 1,700 | 1,600 | 1,600 |
| 9 | 1,700 | 1,700 | 1,700 | 1,700 |

Eighteen Days

| A/B | 1 | 3 | 6 | 9 |
|---|---|---|---|---|
| 1 | 155 | 170 | 160 | 180 |
| 3 | 560 | 505 | 580 | 540 |
| 6 | 1,050 | 1,150 | — | — |
| 9 | 1,250 | 1,200 | 1,200 | 1,200 |

Thirty-six Days

| A/B | 1 | 3 | 6 | 9 |
|---|---|---|---|---|
| 1 | 45 | 33 | 25 | 27 |
| 3 | 120 | 115 | 135 | 225 |
| 6 | 178 | 260 | 280 | 260 |
| 9 | 335 | 350 | 380 | 360 |

Results similar to those shown in Examples I and III have been obtained utilizing the deep implantation apparatus described above, or by the other means of injecting the fungicide into closed chambers.

As can be seen from the above tables, methyl bromide spreads out rapidly to permeate the soil. The surprising fact is there is a greater spread outwardly and downwardly than would be expected from the prior handling of this agent in surface and sub-surface applications. The art previously has taught that when methyl bromide is applied on or within 2 feet of the surface, as disclosed in the use of this agent against nematodes, it is preferred that the soil should be wet or covered in order to retard evaporation. With the method of the instant invention, the soil may be wet or dry and in actuality it is preferred the soil be dry. Implantation of the charge of volatile fumigant at least 3 feet below the soil surface creates high concentrations of agent in the soil for extended periods under either wet or dry conditions.

The following table shows the average time at each depth that a concentration of over 1,000 ppm methyl bromide is maintained in the soil from a deep implantation of an average of one pound of methyl bromide per 100 square feet of surface.

| Depth | Days |
|---|---|
| 1 foot | 5 |
| 3 feet | 12 |
| 6 feet | 20 |
| 9 feet | 18 |

Within 30 days of treatment with methyl bromide, by the method of this invention resulted in the treated area being found substantially free of *Armillaria* infestation. Reinfestation does not occur after treatment with deep implantation of the fumigant agent. The dead cells of the infested material actually acted as a soil nutrient aiding in the rehabilitation of the previously infested area.

While the illustrative embodiments of the invention have been described hereinbefore with particularity, it will be undersood that various other modifications will be apparent to and can readily be made by those skilled in the art without departing from the scope and spirit of the invention. Accordingly, it is not intended that the scope of the claims appended hereto be limited to the examples and description set forth herein, but rather the claims be construed as encompassing all the features of patentable novelty which reside in the present invention including all features which would be treated as equivalents thereof by those skilled in the art to which the invention pertains.

What is claimed is:

1. A process for the deep implantation of a volatilizable fungicide in soil which comprises forming a passageway in the soil to a depth of at least 3 feet with a rotating drilling means, partially elevating said drilling means to form a pocket at the lower end of said passageway prior to injection of said fungicide injecting a volatile fungicide into said pocket through orifice means at the lower end of said drilling means, and then filling said passageway with previously removed soil from the step of forming the passageway by elevating said drilling means while rotating said drilling means in a direction to return the previously removed soil into said passageway.

2. A process according to claim 1, further comprising sealing said pocket from communication with the above ground atmosphere before the step of injecting said fungicide.

3. A process according to claim 1, wherein said fungicide is injected into the soil between 4 and 6 feet below the soil surface.

4. A process according to claim 3, wherein said fungicide is injected at a depth of about 5 feet.

5. A process according to claim 1, wherein said fungicide is methyl bromide.

* * * * *